(12) United States Patent
Rigobert et al.

(10) Patent No.: US 10,062,893 B2
(45) Date of Patent: Aug. 28, 2018

(54) CONNECTION METHOD IN AN ACCUMULATOR AND ACCUMULATOR THUS CONNECTED

(71) Applicant: SAFT GROUPE SA, Bagnolet (FR)

(72) Inventors: Gerard Rigobert, Fargues St Hilaire (FR); Thomas Pouget, Pompignac (FR)

(73) Assignee: SAFT GROUPE SA, Bagnolet (FR)

( * ) Notice: Subject to any disclaimer, the term of this patent is extended or adjusted under 35 U.S.C. 154(b) by 225 days.

(21) Appl. No.: 14/967,990

(22) Filed: Dec. 14, 2015

(65) Prior Publication Data
US 2016/0172655 A1 Jun. 16, 2016

(30) Foreign Application Priority Data
Dec. 15, 2014 (FR) ..................................... 14 62406

(51) Int. Cl.
| | |
|---|---|
| *H01M 2/30* | (2006.01) |
| *B23K 26/342* | (2014.01) |
| *B23K 26/00* | (2014.01) |
| *B23K 26/144* | (2014.01) |
| *B33Y 80/00* | (2015.01) |
| *B33Y 10/00* | (2015.01) |
| *B22F 3/105* | (2006.01) |
| *H01M 10/0525* | (2010.01) |
| *H01M 2/26* | (2006.01) |
| *B23K 103/10* | (2006.01) |

(52) U.S. Cl.
CPC ............. *H01M 2/30* (2013.01); *B22F 3/1055* (2013.01); *B23K 26/0006* (2013.01); *B23K 26/144* (2015.10); *B23K 26/342* (2015.10); *H01M 2/263* (2013.01); *H01M 2/266* (2013.01); *H01M 10/0525* (2013.01); *B23K 2203/10* (2013.01); *B33Y 10/00* (2014.12); *B33Y 80/00* (2014.12)

(58) Field of Classification Search
None
See application file for complete search history.

(56) References Cited

U.S. PATENT DOCUMENTS

2009/0214943 A1* 8/2009 Masson .................. H01M 2/22
429/129

FOREIGN PATENT DOCUMENTS

| | | |
|---|---|---|
| EP | 1 076 371 A1 | 2/2001 |
| EP | 1 102 337 A1 | 5/2001 |
| EP | 1 596 449 A2 | 11/2005 |
| EP | 2 093 820 A1 | 8/2009 |

OTHER PUBLICATIONS

French Search Report with written opinion of French Application No. 14 62 406 dated Jul. 23, 2015.

* cited by examiner

*Primary Examiner* — Daniel S Gatewood
(74) *Attorney, Agent, or Firm* — Sughrue Mion, PLLC

(57) ABSTRACT

A method for connecting electrodes of the same polarity of an accumulator (1) to a current output terminal (6, 7), the accumulator including two current output terminals (6, 7), a container (2) containing an electrochemical bundle (9) having alternating positive and negative electrodes, the ends of the current collectors of the positive and negative electrodes defining a first (Si) and second (S2) surface respectively. There is a step of additive manufacturing of an internal connecting part (11, 13) electrically connecting the first and/or the second surface to the corresponding current output terminal.

13 Claims, 2 Drawing Sheets

CONNECTION METHOD IN AN ACCUMULATOR AND ACCUMULATOR THUS CONNECTED

A subject of the invention is a method for manufacturing an accumulator. More precisely, the present invention relates to the manufacture of an electrical connection part between a current output terminal and the electrodes of the same polarity of an electrochemical bundle in an accumulator.

An electrochemical generator or accumulator (these two terms being equivalent, the term accumulator will be used in the present description) is an electricity production device in which chemical energy is converted to electrical energy. It comprises an electrochemical bundle comprising alternating positive and negative electrodes on either side of a separator impregnated with electrolyte. Each electrode is constituted by a current collector in the form of a metal strip covered on at least one of its faces by an electrochemically active compound. The electrodes, arranged in a container, are electrically connected to current output terminals which ensure electrical continuity between the electrodes and an electricity consumer with which the accumulator is associated. The positive and negative current output terminals can be fixed either to different walls of the container of the accumulator or to the same wall of the container.

Accumulators of cylindrical format generally comprise two current output terminals on the same wall. The accumulator comprises a container having a cylindrical wall closed by a base at one end and open at the other end. A cover is placed over the open end. It supports the current output terminals. A first current output terminal, for example the positive terminal, is welded onto the cover. A second current output terminal, for example the negative terminal, passes through the cover. It can be fixed to the latter by crimping material of the terminal. A seal electrically insulates the negative current output terminal from the cover. The electrochemical bundle, constituted by a winding of positive and negative electrodes and separators, is arranged around a hollow shaft which serves as a gas vent. The ends of the current collectors of the positive and negative electrodes are not covered with electrochemically active compounds. These free ends project at both ends of the electrochemical bundle. The free end of the current collectors of the positive electrodes projects towards the bottom of the electrochemical bundle. The free end of the current collectors of the negative electrodes projects towards the top of the electrochemical bundle. The sections of the free ends are juxtaposed in order to form an essentially flat surface which serves as a location for connection to a connecting part. A flat connecting part connects the positive electrode of the bundle to the base wall of the container, the walls of the container being electrically conductive with the cover. A flat connecting part connects the negative electrode of the bundle to the negative current output terminal.

Typically, the device for electrical connection to the terminal passing through the container, i.e. the negative terminal, can be assembled as follows. A connecting part is welded onto the ends of the collectors of the electrodes of the same polarity, then an additional element is welded to the connecting part at one of its ends and onto the foot of the terminal passing into its other end. Such an internal connection is in particular described in documents EP-A-1 102 337 or EP-A-1 596 449.

However, for power applications, it is necessary to ensure the passing of high currents through the connections of the accumulator, for example currents greater than 100 A. It then becomes necessary to produce the connections with materials of good conductivity such as copper or aluminium. Typically, the strips of the negative electrodes are made of copper and the strips of the positive electrodes are made of aluminium for reasons of compatibility with the active materials, in particular for accumulators of the lithium-ion type. Thus, in lithium-ion technology, the positive terminal connected to the container is generally made of aluminium and the negative terminal is generally made of copper. The connecting part is also chosen to be made of copper in order to ensure good conduction of high currents and compatibility with the negative terminal made of copper.

However, the internal connecting part must be welded to the collectors of the negative electrodes made of copper then to the foot of the terminal passing through. In lithium-ion technology, the welds are typically produced with a laser. Now, laser welding is not effective on copper as the laser beam is naturally reflected by copper. In order to overcome this phenomenon, it is known to use a nickel or stainless steel sheet that is interposed between the copper connecting part and the laser beam in order to "trick" the laser and transmit the thermal energy of the laser towards the copper to be welded. The welding of the internal connecting part therefore requires three parts: the connecting part itself, a nickel welding sheet to be placed on the portion to be welded to the collectors and a nickel welding sheet to be placed on the portion to be welded to the foot of the terminal passing through.

It is also known, in particular from document EP-A-1 596 449, to use an internal connection made of nickel-plated copper. The nickel coating, of a few microns, is applied in order to prevent any oxidation of the copper part and is not thick enough to capture the energy of the laser during welding. Additional nickel welding parts must always be used with a connection made of nickel-plated copper.

The simultaneous management of these three parts makes the method for manufacturing the accumulator more complex and represents a cost. Furthermore, these nickel sheets, with a thickness of approximately 0.5 mm, then remain in the accumulator although they serve only for welding the internal connecting part.

Therefore, it is necessary to reduce the number of parts necessary for manufacturing the accumulators, on the one hand in order to reduce the manufacturing costs and on the other hand in order to lighten the accumulators, while retaining low resistance in order to allow the passing of high currents.

It is moreover known, in particular from document EP-A1-2 093 820, to produce the internal connection made of nickel-plated copper with co-laminated portions of copper/nickel in order to facilitate the welding of the internal connection onto an electrochemical bundle.

However, welding the internal connection onto the electrochemical bundle can cause burning of the separators which can lead to faults in the accumulator. Furthermore, the weld between the internal connection and the electrochemical bundle does not make it possible to obtain satisfactory performance in terms of passing current and mechanical strength. Finally, a co-laminated copper/nickel material has a significant cost.

To this end, the invention proposes constructing the internal connecting part directly on the surface defined by the ends of the collectors of the electrodes.

More particularly, the invention relates to a method for connecting electrodes of the same polarity of an accumulator to a current output terminal, said accumulator comprising two current output terminals, a container containing an electrochemical bundle comprising alternating positive and negative electrodes, the ends of the current collectors of the positive and negative electrodes defining a first and second surface respectively, said method being characterized in that it comprises a step of additive manufacturing of an internal connection electrically connecting the first and/or the second surface to the corresponding current output terminal.

Optional features of the invention, complementary or by substitution, are listed below The additive manufacturing step can be carried out by means of a technique selected from the list constituted by selective laser melting, selective laser sintering, fused deposition modelling.

The connection method can comprise a step in which a conductive element is interposed between the internal connecting part and the current output terminal.

The connection method can comprise a step in which the conductive element is laser welded to the internal connecting part.

The connection method can comprise a step of additive manufacturing of the conductive element so that the conductive element and the internal connecting part form one and the same part.

The additive manufacturing step can be carried out by selective laser melting, according to which a powder is injected in conjunction with the laser beam in order to spray the molten metal onto the first or second surface.

The additive manufacturing step can be carried out by selective laser sintering, according to which layers of metallic powder are successively scanned by a laser beam, the building up of layers of molten powders leading to the production of the internal connecting part.

The additive manufacturing step can be carried out by fused deposition modelling, according to which a wire is unwound in conjunction with the laser beam so as to spray molten metal onto the first or second surface.

The internal connecting part can be produced on the first surface defined by the end of the current collectors of the positive electrodes, the internal connecting part comprising an aluminium-based material.

The conductive element can be brought into electrical contact with the base of the container, said base being in electrical contact with the wall of the container, itself in contact with a cover closing said container, said cover being in electrical contact with the positive current output terminal.

The internal connecting part can be produced on the surface defined by the end of the collectors of the negative electrodes, the internal connecting part comprising a material selected from the group constituted by copper and alloys thereof, nickel and alloys thereof, nickel-alloy steels and stainless steels.

The conductive element can be brought into electrical contact with the negative current output terminal, and preferentially welded thereto.

The internal connecting part can have a thickness comprised between 0.4 and 1.2 mm.

A subject of the invention is also an accumulator comprising two current output terminals, an electrochemical bundle comprising alternating positive and negative electrodes, the ends of the current collectors of the positive electrodes defining a first surface and the ends of the current collectors of the negative electrodes defining a second surface, characterized in that the electrodes of the same polarity are connected to the corresponding current output terminal according to a method according to the invention.

Other features and advantages of the invention will become apparent on reading the following description, given by way of example and with reference to the figures.

Figure 1:
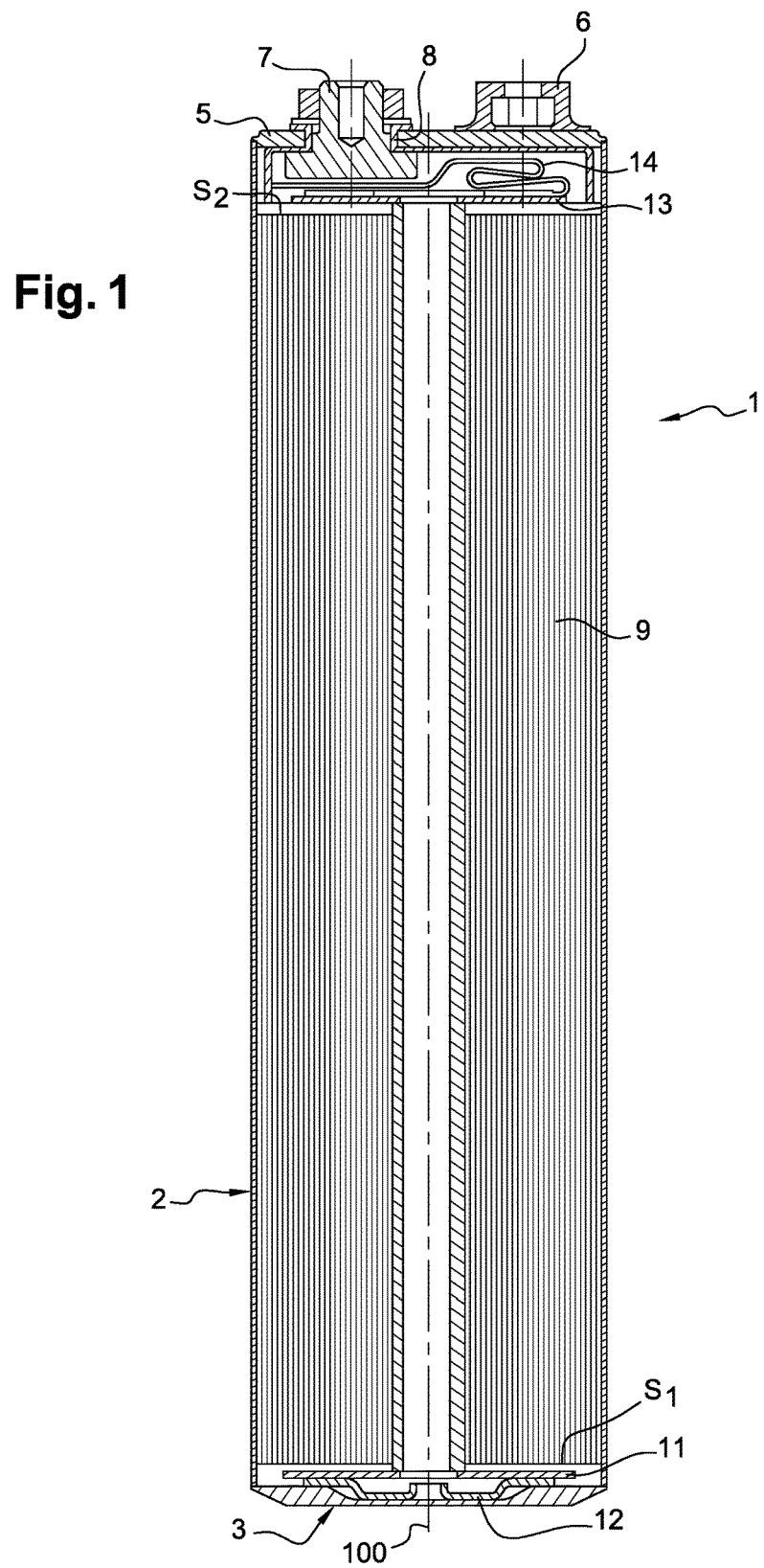
FIG. 1 shows a longitudinal cross-sectional view of a sealed cylindrical accumulator connected according to the invention.

FIG. 1 shows an accumulator 1 which comprises an electrochemical bundle 9 comprising alternating positive and negative electrodes on either side of separators impregnated with electrolyte. Typically, each electrode is composed of a metallic current collector, also called a strip, supporting on at least one of its faces the electrochemically active material. The electrochemical bundle 9 is arranged in a sealed container 2 extending in a longitudinal direction. Said container has a cylindrical wall and is delimited at one of its ends in the longitudinal direction 100 by a base 3 closing one of the ends of the container. The container is also delimited at its other end in the longitudinal direction 100 by a cover 5 provided with current output terminals 6 and 7. A first current output terminal, in the example the positive terminal 6, is generally welded onto the cover. A second current output terminal, in the example the negative terminal 7, passes through the cover; it is generally fixed onto the latter by crimping and a seal 8 electrically insulates the negative current output terminal 7 from the cover 5.

The current output terminals 6, 7 ensure electrical continuity between the electrodes and the external application with which the accumulator is associated. There are several ways of electrically connecting the electrodes of one polarity to one of the current output terminals of the container. A solution consists of using a flat connection applied against the surface defined by the ends of the current collectors of the electrodes of the same polarity.

As shown in FIG. 1, an internal connecting part 11 connects the surface S1 defined by the ends of the collectors of the positive electrodes of the bundle 9, these ends not being covered with electrochemically active compounds, to a conductive shaped part 12. The latter is itself in contact with the base 3 of the container, the base 3 as well as the side walls of the container being electrically conductive with the cover 5 and the positive terminal 6 welded to the cover.

It should be noted that the conductive shaped part 12 is optional and that another embodiment can be envisaged with a connecting part 11 directly connected to the base 3 of the container.

According to the invention, the method for connecting the electrodes of the same polarity to the corresponding current output terminal of a current accumulator comprises a step according to which a container is provided, containing an electrochemical bundle provided with alternating positive and negative electrodes with separators on either side. Then a step of additive manufacturing of the internal connecting part is carried out on at least one of the surfaces defined by the ends of the collectors of the electrodes of the same polarity.

By "additive manufacturing step" is meant a step which consists of forming a part by adding material and/or by building up successive layers, as opposed to forming by removing material, such as machining, this manufacturing step being computer aided. These manufacturing steps are particularly economically appropriate to the production of small components in large quantities or to the custom production of parts of great geometric complexity.

Additive manufacture is defined as a function of three main parameters, namely the choice of the base material, the type of energy source used and the computer-aided design (CAD) model.

In the present case, and due to the fact that the base material of the component to be manufactured is a metallic material, the forming process is of the physical type (as opposed to a process of the chemical type). It consists either of melting the base material followed by solidification of said molten material, or sintering of said material.

The base material can be in the form of powder, tape or wire. This material can be present from the start of the forming process or deposited as this process proceeds.

The energy input is provided by a laser beam or by means of a heat source.

Advantageously, the additive manufacturing step is selected from the list constituted by selective laser melting, selective laser sintering and fused deposition modelling.

The additive manufacturing step of the "selective laser melting" type consists of melting a metallic powder through a nozzle heated to a high temperature. A molten filament (of the order of one-tenth of a millimeter) is deposited continuously in a line so as to reconstitute the three-dimensional model by adhering through melting on what has been deposited previously. Selective laser melting makes it possible to precisely control the energy inputs and consequently the heating of the substrate, the substrate being defined by the surface on which the material is deposited. Therefore, it is possible to adapt the power of the laser so as to protect the surface defined by the ends of the collectors of the electrodes of the same polarity. This is a particularly advantageous embodiment for assembling the negative and positive connections on the respective polarities of the electrochemical bundle. In fact, the molten metal will be directly and closely connected to the electrodes of the bundle ensuring perfect electrical continuity The additive manufacturing step of the "selective laser sintering" type is similar to that which is based on selective laser melting. In fact, it consists of depositing successive two-dimensional layers in order to reconstitute the three-dimensional model. This manufacturing step requires a continuous supply of thin layers of powder successively scanned by a high-power laser in order to melt them. Solidification takes place directly after the laser stops. However, in this case, the high-power laser carries out sintering of the thin layers of powder and not simple melting. This method then makes it possible to obtain internal connections independently of the support and according to the desired design. These connections can then be attached to the first or the second surface. This method is particularly suited to the production of parts with complex shapes, which can be the case when connections are produced.

The additive manufacturing step of the "fused deposition" type is very similar to "selective laser melting"; it consists of melting a metal wire through a nozzle heated to a high temperature. A molten filament (of the order of one-tenth of a millimeter) is continuously deposited in a line so as to reconstitute the three-dimensional model by adhering through melting on what has been deposited previously. This is also the preferred embodiment for directly assembling the negative and positive connections on the respective polarities of the electrochemical bundle.

Of course, the internal connecting part can be produced on the first surface S1 defined by the ends of the collectors of the positive electrodes, just as on the second surface S2 defined by the ends of the collectors of the negative electrodes.

In the case where the internal connecting part is produced on the first surface S1 defined by the ends of the collectors of the positive electrodes, the internal connecting part is preferably constituted by an aluminium alloy, so as to be compatible with the base and the container.

In the case where the internal connecting part is produced on the second surface S2 defined by the ends of the collectors of the negative electrodes, the internal connecting part is preferably constituted by a copper alloy, so as to be compatible with the negative terminal, which is itself made of copper alloy. It should be noted that other materials could equally well be compatible with the negative terminal, namely nickel alloys, nickel-alloy steels and stainless steels.

Advantageously, the manufacturing method can comprise a step according to which a conductive element is interposed between the internal connections and the current output terminal to which they are connected.

Thus, as shown in FIG. 1, an elastic conductive element 12 as described in the French patent application No. 0902910 of 15 Jun. 09, having a suitable shape for establishing a contact between the base 3 of the container and the internal connecting part 11, is interposed between the internal connecting part 11 and the positive current output terminal 6. This element also facilitates the complete tearing of the base of the container in the case of excess pressure inside the container.

Similarly, a conductive element 14 having the form of a tongue is interposed between the internal connecting part 13 and the negative current output terminal 7.

Figure 2:
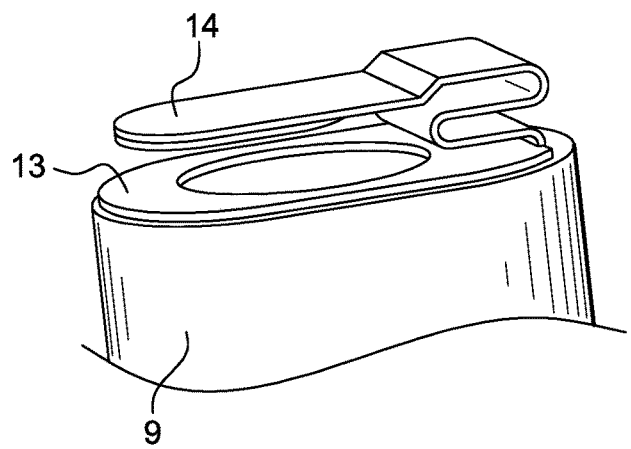
FIG. 2 shows a view of an internal connecting part constructed according to the invention at one of the ends of an electrochemical bundle according to a certain configuration.

As shown in the detailed FIG. 2, the tongue 14 can form at least one fold in order to provide an elastic effect to the electrical connection between the negative electrodes and the negative current output terminal which compensates for the variations in height of the electrochemical bundles from one accumulator to another.

In the case where a tongue 14 is interposed between the internal connecting part 13 and the negative current output terminal 7, it is possible to attach said tongue to said connection according to a conventional laser welding step. Similarly, the contact between the negative current output terminal and the tongue can also be made during this welding step.

Figure 3:
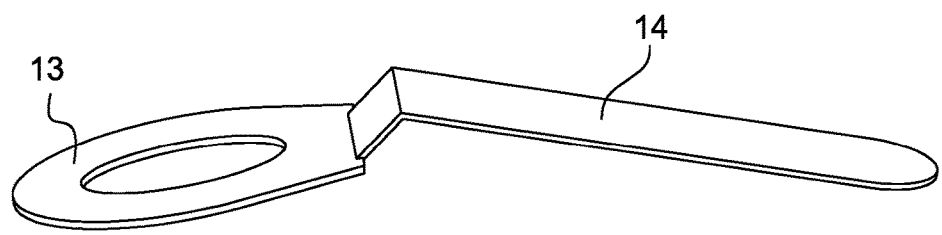
FIG. 3 shows a detailed view of an internal connecting part constructed according to the invention in another configuration.

However, it is particularly advantageous, following an additive manufacturing step, to construct the tongue in a continuation of the additive manufacturing step of the internal connecting part, so that the tongue and the internal connecting part form one and the same part, as shown in FIG. 3.

Advantageously, the internal connecting part allows for a thickness comprised between 0.4 and 1.2 mm, the minimum value guaranteeing a mechanical strength of the bond and a minimum passing of current, and the maximum value allowing the passing of currents of the order of 300 A continuously, and up to a few thousand amperes in pulsed mode.

The internal connections 11, 13 according to the invention allow the passing of high currents for power applications. The internal resistance of an accumulator with such internal connections was measured and compared to the internal resistance of an accumulator according to the prior art provided with welded connections and produced without using an additive manufacturing step. The internal resistance of the accumulator according to the invention is substantially lower than the internal resistance of an accumulator with a connection welded and produced without using an additive manufacturing step.

Thanks to these additive manufacturing techniques, the internal connections 13, 14 have extremely precise and constant thicknesses over their entire surface area. In the context of accumulators of the lithium-ion type, they are of the order of 0.5 mm to 1 mm.

Being able to dispense with the nickel sheets of the prior art makes it possible to make the accumulators more compact and lighter. The manufacturing cost of the accumulators can also be reduced, as a single part is used for the internal connecting part.

Furthermore, the connection method described above makes it possible to produce a bond between the connecting part and the electrochemical bundle having a better mechanical strength and passes current better compared with a weld produced between a connecting part made of co-laminated copper/nickel material and an electrochemical bundle, such as for example in document EP-A1-2 093 820. Furthermore, the production of this bond does not lead to burning of the separators.

Furthermore, the additive manufacturing step allows better cohesion of the internal connecting part with the surface defined by the ends of the collectors of the electrodes of the same polarity. In fact, the progressive construction of the internal connecting part, which incorporates steps of solidification of the molten material, makes it possible to obtain virtual continuity of the current-passing sections. Therefore, higher-power performances are obtained than those obtained with a laser-welded connecting part. Moreover, this virtual continuity also makes it possible to obtain a reduction in the internal resistance of the accumulator.

The embodiments described above in relation to the figures must be considered as having been presented by way of a non-restrictive illustration, and the invention is not supposed to be limited to the details provided here but can be modified without exceeding the scope of the attached claims. In particular the current output terminal welded to the cover wall can be the negative terminal and the current output terminal welded by crimping through the cover can be the positive terminal. The invention also applies to any type of accumulator, whether prismatic, cylindrical or of the lithium-ion, nickel-cadmium or nickel metal hydride type.

The invention claimed is:

1. Method for connecting electrodes of a same polarity of an accumulator to a current output terminal, said accumulator comprising:
    two current output terminals,
    a container containing an electrochemical bundle comprising alternating positive and negative electrodes respectively including metallic current collectors, the ends of the current collectors of the positive and negative electrodes defining a first and second surface respectively,
        wherein said method comprises a step of additive manufacturing of an internal connecting part electrically connecting the first and/or the second surface to the corresponding current output terminal, and
        wherein the additive manufacturing step is carried out by means of a technique selected from the list constituted by:
    selective laser melting, according to which a powder is injected in conjunction with the laser beam in order to spray a molten metal over the first or second surface;
    selective laser sintering, according to which layers of metallic powder are successively scanned by a laser beam, the building up of the layers of molten powders leading to the production of the internal connection part; and
    fused deposition modelling, according to which a wire is unwound in conjunction with the laser beam so as to spray molten metal over the first or second surface.

2. Connection method according to claim 1, wherein said method comprises a step in which a conductive element is interposed between the at least one internal connecting part and the current output terminal.

3. Connection method according to claim 2, wherein said method comprises a step in which the conductive element is laser welded to the internal connecting part.

4. Connection method according to claim 2, wherein said method comprises a step of additive manufacturing of the conductive element so that the conductive element and the internal connecting part form one and the same part.

5. Connection method according to claim 2, wherein the internal connecting part is produced on the first surface defined by the end of the current collectors of the positive electrodes, the internal connecting part comprising an aluminium-based material.

6. Method for connecting a current accumulator according to claim 5, wherein the conductive element is brought into electrical contact with the base of the container, said base being in electrical contact with the wall of the container, itself in contact with a cover closing said container, said cover being in electrical contact with the positive current output terminal.

7. Connection method according to claim 2, wherein the internal connecting part is produced on the second surface defined by the end of the collectors of the negative electrodes, the internal connecting part comprising a material selected from the group constituted by copper and alloys thereof, nickel and alloys thereof, nickel-alloy steels and stainless steels.

8. Connection method according to claim 7, wherein the conductive element is brought into electrical contact with the negative current output terminal, and preferentially welded thereto.

9. Connection method according to claim 1, wherein the internal connecting part has a thickness comprised between 0.4 and 1.2 mm.

10. Accumulator comprising two current output terminals, an electrochemical bundle comprising alternating positive and negative electrodes respectively including metallic current collectors, the ends of the current collectors of the positive electrodes defining a first surface and the ends of the current collectors of the negative electrodes defining a second surface, wherein the electrodes of a same polarity are connected to the corresponding current output terminal according to a method comprising a step of additive manufacturing of an internal connecting part electrically connecting the first and/or the second surface to the corresponding current output terminal, wherein the additive manufacturing step is carried out by means of a technique selected from the list constituted by:
    selective laser melting, according to which a powder is injected in conjunction with the laser beam in order to spray a molten metal over the first or second surface;
    selective laser sintering, according to which layers of metallic powder are successively scanned by a laser beam, the building up of the layers of molten powders leading to the production of the internal connection part; and fused deposition modelling, according to which a wire is unwound in conjunction with the laser beam so as to spray molten metal over the first or second surface.

11. Accumulator according to claim 10, wherein said accumulator further comprises a conductive element interposed between the at least one internal connecting part and the current output terminal.

12. Accumulator according to claim 11, wherein the conductive element is laser welded to the internal connecting part, or the conductive element forms one and the same part with the internal connecting part by additive manufacturing.

13. Accumulator according to claim 10, wherein the internal connecting part has a thickness comprised between 0.4 and 1.2 mm.

* * * * *